United States Patent [19]
Caffo et al.

[11] 3,986,129
[45] Oct. 12, 1976

[54] GENERATION OF SUBMICROSECOND PULSES IN A LONG LASER

[75] Inventors: John A. Caffo; Alexander A. Abela; Theodore N. Ledbetter; Darrell W. Joubert, all of Albuquerque, N. Mex.

[73] Assignee: The United States of America as represented by the Secretary of the Air Force, Washington, D.C.

[22] Filed: July 25, 1972

[21] Appl. No.: 274,541

[52] U.S. Cl. .......................... 330/4.3; 331/94.5 Q; 331/94.5 C
[51] Int. Cl.² ...................... H01S 3/08; H01S 3/11; H01S 3/23
[58] Field of Search ................... 330/4.3; 332/7.51; 331/94.5 Q, 94.5 M

[56] References Cited
UNITED STATES PATENTS

| | | | |
|---|---|---|---|
| 3,353,115 | 11/1967 | Maiman | 332/7.51 |
| 3,416,097 | 12/1968 | Simpson | 331/94.5 Q |
| 3,486,129 | 12/1969 | Van Tran et al. | 331/94.5 Q |
| 3,506,927 | 4/1970 | Witte et al. | 331/94.5 Q |
| 3,597,695 | 8/1971 | Swain et al. | 330/4.3 |
| 3,733,129 | 5/1973 | Bridges | 356/5 |
| 3,736,526 | 5/1973 | Simmons | 331/94.5 Q |

Primary Examiner—Nelson Moskowitz
Attorney, Agent, or Firm—Joseph E. Rusz; Willard R. Matthews, Jr.

[57] ABSTRACT

A standard cavity, Q switched laser is used to initiate and sustain submicrosecond pulses in a long laser. Short pulses from the standard cavity laser are directed onto the remote reflector of a long laser and are then reflected back through the lasing material of the long laser. Properly timed activation of the long laser lasing material causes amplification and oscillation of the pulses in the long laser cavity. Beam expanding telescopes are used to focus the laser pulses on the long laser's remote reflector.

5 Claims, 1 Drawing Figure

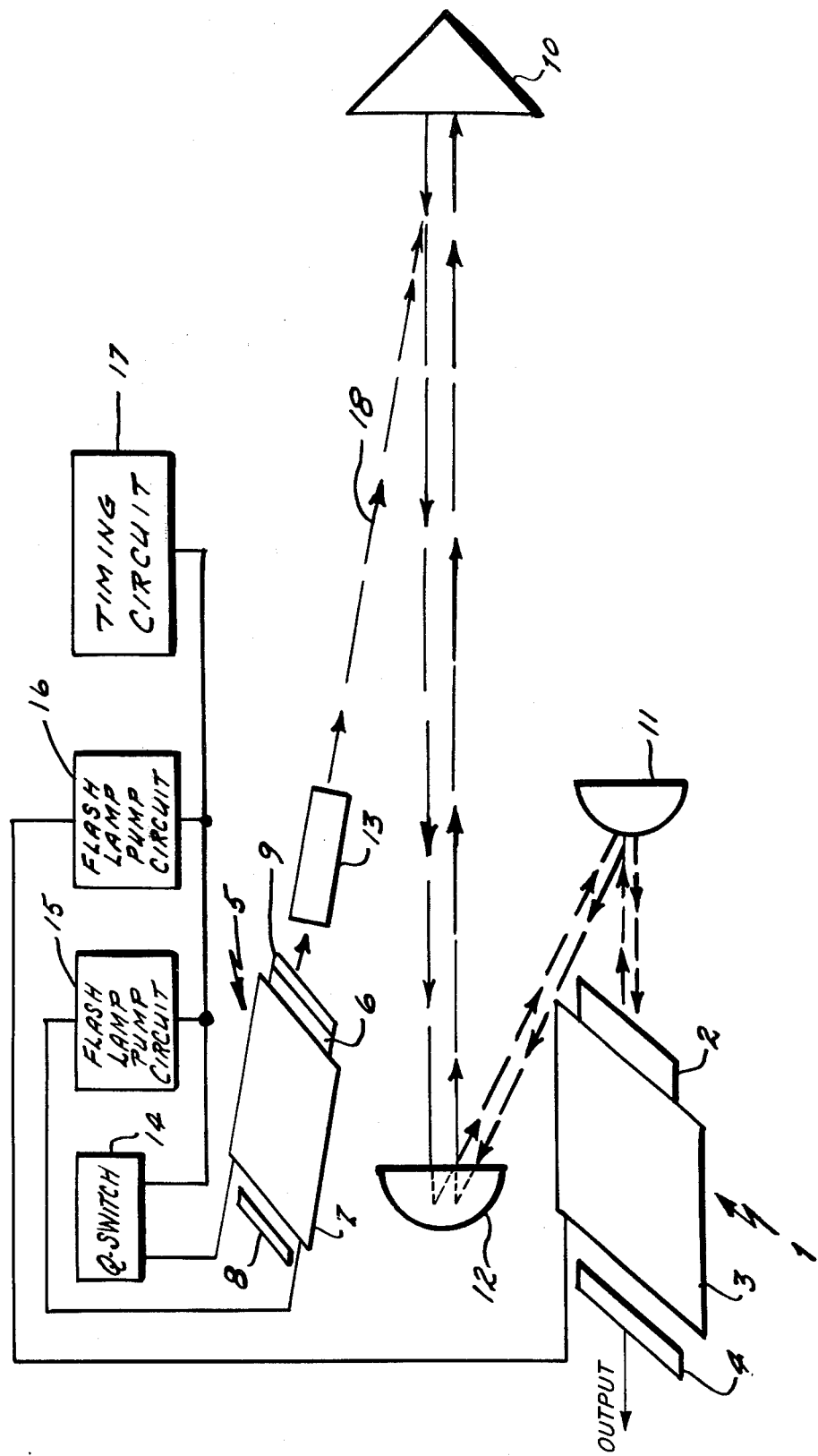

GENERATION OF SUBMICROSECOND PULSES IN A LONG LASER

BACKGROUND OF THE INVENTION

This invention relates to pulsed laser systems, and in particular to submicrosecond pulsing of so-called long lasers.

The term "long laser" refers to a laser cavity of a length on the order of several kilometers or greater which uses a remote front retroreflector. Long lasers are generally high power devices and the generation of submicrosecond pulses with them is difficult. This has been particularly true when the modulation takes the form of nanosecond pulsing. To date no completely satisfactory method of achieving submicrosecond pulsing of high power long lasers has been developed. The present invention is directed toward accomplishing this end.

SUMMARY OF THE INVENTION

The invention comprehends a novel method and apparatus for generating submicrosecond pulses in a long laser. The generation of submicrosecond pulses is accomplished by placing a standard cavity laser in proximity to the long laser so that its output impinges upon the remote front corner cube of the long laser. A small fraction of this output energy is reflected from the corner cube into the long laser cavity. The standard cavity laser generates a submicrosecond pulse by ordinary methods (such as Q-switching with a rotating mirror). The submicrosecond pulse is amplified by the long laser rods and in this manner tends to modulate the long laser energy into a chain of submicrosecond pulses separated by the round trip time associated with the long laser cavity.

It is a principal object of the invention to provide a new and improved pulsed laser system.

It is another object of the invention to provide a laser control system adapted to accomplish submicrosecond pulsing of a long laser.

It is another object of the invention to modulate the beam of a long laser by means of a Q-switched high power standard cavity laser.

These, together with other objects, advantages and features of the invention will become more readily apparent from the following detailed description when taken in conjunction with the illustrative embodiment in the accompanying drawing.

DESCRIPTION OF THE DRAWING

The sole FIGURE of the drawing is a block diagram of one presently preferred embodiment of the invention.

DETAILED DESCRIPTION OF THE PREFERRED EMBODIMENT

Referring now to FIG. 1, long laser 1 is illustrated as comprising laser medium 2, rear reeflector 4, remotely located front reflector 10, and a pumping means consisting of flash lamps 3 and flash lamp pump circuit 16. Control (or modulating) laser 5 is positioned adjacent long laser 1 and oriented to direct its output laser pulse onto the long laser front reflector 10. Control laser 5 comprises laser medium 6, rear reflector 8, front partial reflector 9 and the pumping means consisting of flash lamps 7 and flash lamp pump circuit 15. Control laser 5 is also provided with Q-switch 14 which effects nanosecond pulsing of its output. The pulsed output 18 of control laser 5 is enlarged and focused on front reflector 10 by means of beam expanding telescope 13. In operation, laser pulses from beam 18 are reflected back through the cavity and laser medium of long laser 1 via a beam enlarging off-set telescope that includes concave reflector 12 and convex reflector 11. Timing circuit 17 coordinates the operation of control laser 5 and the pump circuit of long laser 1 to effect activation of laser medium 2 during the time laser pulses are traversing it.

By way of a specific example, the generation of submicrosecond pulses in a long laser has been accomplished using neodymium doped yttrium aluminum garnet (Nd:YAG) as the lasing material operating at 1.06 microns.

The long laser includes two Nd:YAG rods in series, a rear 99 percent reflector (retroreflector or flat mirror) and a remote retroreflector (corner cube 10). The Nd:YAG Rods were ¼ × 3.25 inches and were each enclosed in a separate double lamp, close-wrapped head. A maximum gain of approximately 70 db can be generated using this configuration. The output beam from the double rod configuration was expanded through an off-axis telescope with a magnification of 29X. The remote corner cube was placed at 3.3 kilometers to complete the long laser cavity. The distance of 3.3 kilometers was an arbitrary geographically convenient receiver site location. The flash lamps were pumped with a pulse length of approximately 250 microseconds and a maximum input of about 200 joules per lamp.

The control laser, a Nd:YAG Q-switched standard cavity laser, was positioned adjacent to the long laser heads. The output of the Q-switched laser consisted of a 450 millijoule, 20 nanosecond pulse. This output was passed through a beam expanding telescope producing a spot approximately 5 feet in diameter at 3.3 kilometers. The system was aimed so that this spot was centered upon the remote corner cube of the long laser.

The sequence of generating submicrosecond pulses starts with the firing of the Q-switched laser. The remote corner cube reflects the incident light back toward the source typically within several arc seconds or less. Some of this reflected light impinges upon the primary mirror of the long laser's beam expanding telescope and is reflected back into the Nd:YAG rods. The lamps of the long laser cavity are timed to flash so that the long laser cavity reaches the threshold for lasing at approximately the time that the Q-switched pulse reaches the rods. The pulse is amplified as it makes its first double pass through the set or rods. The amplified pulse then passes through the beam expander to the remote corner cube where it is again reflected back to the primary mirror and the process is repeated. The result is a chain of 20 nanosecond Q-switched pulses separated by the 6.6 kilometer round trip time.

There are two important variables associated with the generation of submicrosecond pulses in a long laser. The most important variable is type of lasing material used. Materials such as Nd:Glass, other Nd doped crystals with gain characteristics intermediate between that of glass and YAG; ruby, liquid lasers and dye lasers, are all comprehended by the invention. Another important variable is the output pulse length of the Q-switched cavity. Picosecond pulses are also intended for use with the present invention.

While the invention has been described in its preferred embodiment, it is understood that the words which have been used are words of description rather than words of limitation and that changes within the purview of the appended claims may be made without departing from the scope and spirit of the invention in its broader aspects.

What is claimed is:

1. A pulsed laser system comprising
   a long laser including a laser medium, a back reflector, a remotely located front reflector, and pump means adapted to stimulate said laser medium into emission,
   a pulsed control laser, said control laser being positioned to direct laser pulses emitted therefrom onto said remotely located front reflector,
   a timing circuit for coordinating pulsed operation of said control laser and activation of said long laser pump means, and
   an off-axis telescope disposed between said laser medium and said remotely located front reflector.

2. A pulsed laser system as defined in claim 1 including a beam expanding telescope disposed between said control laser and said remotely located front reflector.

3. A pulsed laser system as defined in claim 2 wherein said timing circuit effects actuation of said long laser pump means during times when laser pulses traverse the laser medium of said long laser.

4. A pulsed laser system as defined in claim 3 wherein the laser medium of said long laser comprises series connected neodymium doped yttrium aluminum garnet rods.

5. A pulsed laser system as defined in claim 4 wherein said control laser comprises a nanosecond Q-switched laser.

* * * * *